UNITED STATES PATENT OFFICE.

DORA ESTELLE NEUN, OF NEW YORK, N. Y., ASSIGNOR TO G. W. CARNRICK CO., OF NEW YORK, N. Y., A CORPORATION.

MANUFACTURE OF ACTIVATED PANCREATIN AND STABILIZATION OF SAME.

1,404,137. Specification of Letters Patent. Patented Jan. 17, 1922.

No Drawing. Application filed May 25, 1920. Serial No. 384,229.

*To all whom it may concern:*

Be it known that I, DORA E. NEUN, a citizen of the United States, and a resident of the city of New York, borough of Manhattan, county and State of New York, have invented new Improvements in the Manufacture of Activated Pancreatin and Stabilization of Same, of which the following is a full, clear, and exact description.

This invention relates to means for preserving the amylolytic digestive power of activated pancreatin.

Pancreatin is ordinarily prepared from the pancreas of animals and contains several digestive enzymes, one of which, amylopsin, converts starch into soluble carbohydrates. Other digestive ferments in the pancreatin emulsify and decompose the fats and convert the proteins into proteoses, peptones, and amino acids. As sold commercially, pancreatin is in the form of a dry powder and is tested for its amylolytic power by the method described in the United States Pharmacopoeia, which briefly consists in the digesting of 7.5 grams of dry potato starch with 0.3 grams of pancreatin at 40° C. for exactly five minutes, at which time the digestion should have progressed to such an extent that iodine fails to reveal the presence of unconverted starch. It has been known that certain substances increase the digestive power of the amylopsin in the pancreatin, but only one has been used commercially, viz: sodium chloride. The increase of power depends upon the proportion in which sodium chloride is used. For instance, a mixture of about 85% pancreatin and 15% sodium chloride has about double the amylolytic power of the pure pancreatin. However, I have found that these mixtures, whether commercial articles or made by myself, do not hold their strength, but showed after a period of about seven months a loss of from 33% to 50% of the amylolytic power.

An object of this invention, therefore, is to add a substance to the pancreatin activated with sodium chloride, which will stabilize or preserve the amylolytic power of such a mixture.

Another object of this invention is to provide a substance for this purpose which does not impair but rather helps to increase the activity of the mixture.

A further object of this invention is to provide a substance which may be taken into the human system without causing harmful results.

I have found that by the use of di-sodium phosphate all these objects may be accomplished. Di-sodium phosphate is a harmless substance, being a normal constituent of the blood; it will prevent the deterioration of the amylolytic power of the pancreatin-sodium chloride mixture, and will also increase its amylolytic power above that normally caused by the sodium chloride. However, in order to be effective as a stabilizer the percentage of di-sodium phosphate in the mixture must not be too small. I found that mixtures consisting of 79% to 80% pancreatin, from 10% to 13.5% sodium chloride, and from 7.5% to 10% di-sodium phosphate showed good keeping qualities, while a mixture containing only 1% di-sodium phosphate, 14% sodium chloride and 85% pancreatin did not keep its amylolytic power.

It is thus seen that the addition of di-sodium phosphate in proper proportion will preserve the amylolytic power of the activated pancreatin so that it may be stored in tightly sealed containers for long periods of time without deterioration, and thus will be provided a commercial digestant which can be relied upon to give high and uniform amylolytic action.

The preparation of the improved activated pancreatin is as follows:

A properly defatted and finely ground pancreatin, dried and finely ground sodium chloride, and finely ground "desiccated di-sodium phosphate" are mixed together until a uniform mixture is obtained. The preparation is kept in tightly sealed containers.

I would state in conclusion that while the described samples constitute a practical embodiment of my invention, I do not limit myself strictly to the details herein described, since manifestly the same can be considerably varied without departure from the spirit of the invention as defined in the appended claims.

Having thus described my invention, I claim as new and desire to secure by Letters Patent:

1. A composition of matter for use as a digestant which contains pancreatin and di-sodium phosphate.

2. A composition of matter for use as a digestant which contains pancreatin, sodium chloride and di-sodium phosphate.

3. A composition of matter for use as a digestant, which consists of approximately 7.5 to 10% di-sodium phosphate, approximately 10-13.5% sodium chloride and the balance of pancreatin, all the ingredients being moisture-free.

4. A composition of matter for use as a digestant, which contains pancreatin, and di-sodium phosphate, the ingredients being moisture-free.

5. A composition of matter for use as a digestant, which contains pancreatin, sodium chloride and di-sodium phosphate, the ingredients being moisture-free.

DORA ESTELLE NEUN.